United States Patent Office 2,855,289
Patented Oct. 7, 1958

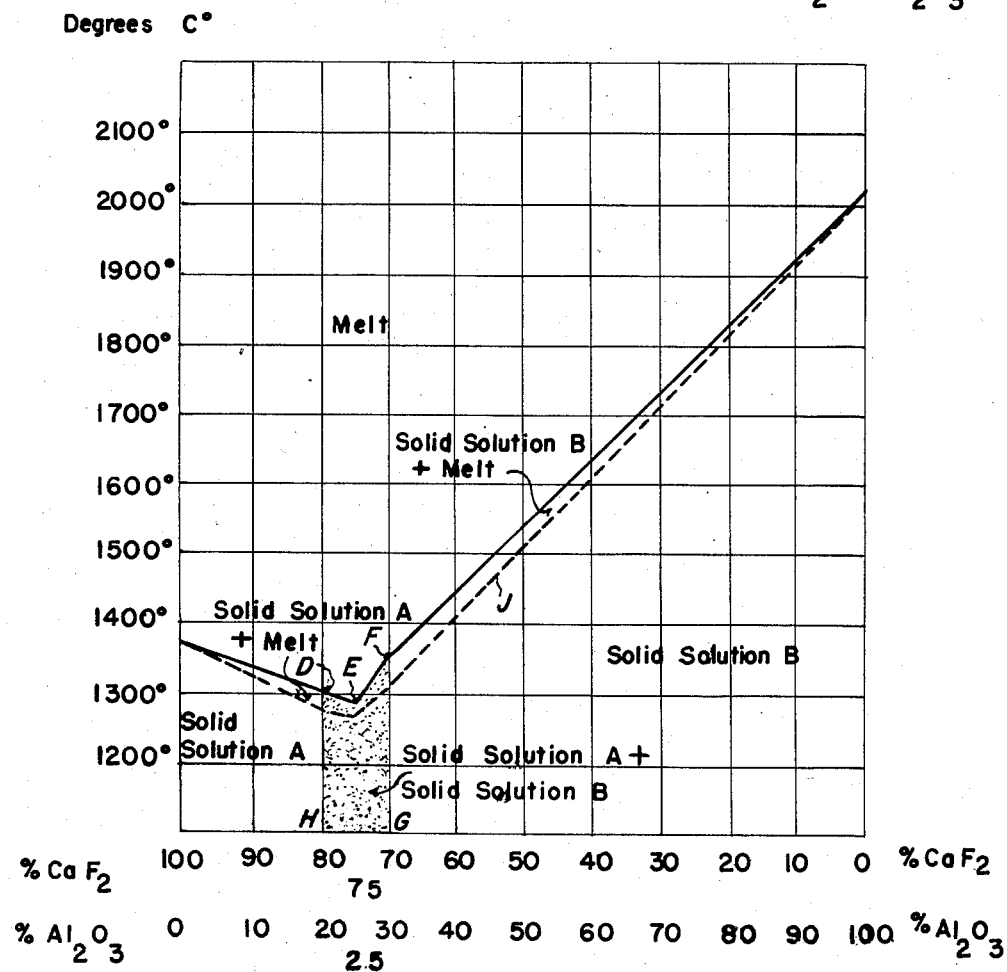

2,855,289

FLUIDIZING SLAGS OF OPEN HEARTH AND ELECTRIC FURNACE STEEL MAKING PROCESSES USING EUTECTIC MIXTURE

James J. Bowden, Cortland, Ohio

Application November 4, 1957, Serial No. 694,417

3 Claims. (Cl. 75—30)

This invention relates to the manufacture of iron and steel by the open hearth and electric furnace processes, but more particularly to that part of these processes which relates to the proper conditioning of the slag which floats upon the molten metal.

It is well known to those skilled in the art in the manufacture of steel by the open hearth process that in one of the standard methods of operation the furnace is charged with limestone or lime, iron ore, steel scrap and pig iron in that sequence. The metallic charge is then melted by applied heat from oil or gas. With an electric furnace electricity is used. And it is also known that when the metal has become molten, the lime, which has been charged on the bottom of the furnace, tends to rise into the slag which is mainly a liquid overlying the steel bath. The pig iron can be added in either a molten condition or in solid form (cold iron). When the pig iron is relatively high in amount by weight of the charge, iron ore is made a part of the charge for the purpose of oxidizing the silicon content in the pig iron. The amount of pig iron determines whether there will be a flush slag. And the reaction between the early, low melting point slag ($FeOMnOSiO_2$), and the carbon in the iron charge, which is oxidized, causes a foamy slag, which in turn is allowed to flush out of the furnace in the early stages of the process, taking with it a large percentage of the silicon; this slag is called the "flush slag."

In the open hearth process iron ore is by no means always employed. Large tonnage of steel is also made by charging limestone, steel scrap and pig iron in this designated order. Or where burned lime is used the operator conventionally charges small amount of scrap onto the bottom of the furnace, then burned lime, then the balance of the scrap, and finally pig iron. The pig iron can be added cold or in the molten condition. With this type of charge there is usually no flush or run-off slag. This type of open hearth charge is called "scrap charge."

Examples of flush and scrap charges are given below:

FLUSH CHARGE PRACTICE

|  | #1 | | #2 | | #3 | |
| --- | --- | --- | --- | --- | --- | --- |
|  | Pounds | Percent | Pounds | Percent | Pounds | Percent |
| Scrap | 141,900 | 45.2 | 110,200 | 31.5 | 63,000 | 18.0 |
| Hot Metal | 160,500 | 51.2 | 210,000 | 60.0 | 245,000 | 70.0 |
| Iron in Ore | 11,400 | 3.6 | 29,800 | 8.5 | 42,000 | 12.0 |
| Total Metal | 313,800 | 100.0 | 350,000 | 100.0 | 350,000 | 100.0 |
| Charge Ore | 21,500 | 6.9 | 46,000 | 13.1 | 65,000 | 18.5 |
| Limestone | 23,000 | 7.3 | 19,000 | 5.4 | 17,500 | 5.0 |

SCRAP CHARGE PRACTICE

| Cold Pig Iron—Charge #4 | | Hot Pig Iron—Charge #5 | |
| --- | --- | --- | --- |
|  | Percent |  | Percent |
| Scrap | 60.7 | Scrap | 66.6 |
| Cold Metal | 39.3 | Hot Metal | 33.4 |
| Total Metal | 100.0 | Total Metal | 100.0 |
| Limestone | 6.6 | Limestone | 4.9 |

Since the electric furnace process of steel manufacture is conventional, it will not be described herein in detail.

As is well known in this technological branch of science, the slag is the key to the production of steel ingots, for it is necessary to have a properly conditioned slag to have properly made, quality steel. And coincidental with this feature we know that a properly conditioned slag cannot be had until the lime is in solution in the slag; or has been well stated "the slag should be mature" to properly control the manufacture of steel. The lime solution process is not one of lime dissolving directly in the early slag, as will now be explained. As the lime, which is charged on the bottom of the furnace or which composes the layer overlying the small amount of scrap iron on the bottom, is finally released when the metallic charge is melted, it rises through the molten metal and into the iron manganese silicate because of its lower specific gravity. The lumps of lime as they go up through this iron manganese silicate slag are coated by the slag. But because of the greater affinity of lime for silica, the manganese and iron in combined form in this coating are replaced or exchanged by calcium of the lime, resulting in a coating of one or more calcium silicates, specifically dicalcium silicate ($2CaOSiO_2$) around the lumps of lime floating in the slag bath.

Because of its properties, dicalcium silicate seals off the further calcination or solution of the lime thus encased. The reason for this is that dicalcium silicate has a melting point of 2130° C., which is roughly some 500° C. higher than the operating temperature of the open hearth furnace practice. For the open hearth furnace is made up mainly of silica brick, and such a furnace is only suitable for operation at temperature not in excess of 1650° C.–1700° C. Hence, some other means than a high temperature alone is necessary to dissolve the limestone or lime, and get it into solution in the slag by reaction, since the furnace structure will not stand up under the temperature necessary to melt dicalcium silicate. Normally this is accomplished by the oxidation of iron in the charge, and the resulting iron oxides then combine with lime in the slag to eventually form dicalcium ferrite ($2CaOFe_2O_3$) which has a melting point of 1436° C., a temperature well within the furnace operating temperature range. The dicalcium ferrite, it is believed, reacts with the coating of dicalcium silicate which surrounds the lumps of lime; and by reason of the law of eutectics it dissolves the coating of dicalcium silicate from around the lumps of lime. Free lumps of lime then again become coated with iron manganese silicate which later reacts as just explained forming a coating of dicalcium silicate around the lumps of lime. The reaction of dicalcium ferrite with the coating of dicalcium silicate again takes place dissolving this coating as just explained. This series of reaction is repeated until all the lime is brought in solution or remains present in the slag as excess, uncombined free lime. In practice this waiting for such oxidation reactions and combination of iron oxide with lime to form dicalcium ferrite is too slow, so the furnace operator commonly resorts to the use of fluoride additions as a flux to speed up the solubilizing reaction of the lime. The slag which has been thick is thinned by such conditions. Fluorspar has a M. P. of 1360° C. It is believed, that as pointed out under the heading "Fluorspar reactions" below that dicalcium ferrite is formed by the reaction of $CaF_2$ with dicalcium silicate, and iron oxide, and by products silicon fluoride and calcium oxide. The silicon fluoride is evolved as a gas. However, fluorspar in some cases is both detrimental to the quality of the steel and in creating difficult conditions of operation. If too much thereof is added or if it is added too soon such conditions as foamy slags or watery-thin slags tend to result. Furthermore excess carbon reduction and metal heats that are low in quality because of these factors are encountered because of these factors.

The principal object of the present invention is to condition open hearth and electric furnace steel slags containing calcium oxide and calcium silicates; more particularly to fluidize such slags, yet without possessing disadvantages that fluorspar alone has in this same role.

Another object of the present invention is to provide a fluxing material to fluidize such slags by using a fluxing material which has a melting point lower than that of fluorspar (1360° C.=2480° F.) and of lime (2570° C.) and dicalcium silicate (2130° C.).

Another object of the present invention is to fluidize such slags by means of a fluxing material which will decrease the time necessary to fluidize such slags and thus increase the production of steel, i. e., tons per furnace hour.

A more particular object of the present invention is to fluidize open hearth and electric furnace steel slags containing calcium oxide and a calcium silicate, by adding a eutectic mixture having certain percentage relations to each other of $CaF_2$ and $Al_2O_3$, whereby the advantage of $CaF_2$ as to rapidity in fluidizing and fluxing lime is attained but without the disadvantage of over-oxidation of the slag and other disadvantages attendant from the use of $CaF_2$ alone.

These and other objects will become obvious or apparent hereinafter, from reading the disclosure, more especially also by recourse to the accompanying drawing.

The material which is the flux of my invention is a eutectic mixture composed of 20-30% aluminum oxide and 80-70% calcium fluoride each by weight. It is therefore a solid solution of 20-30% aluminum oxide in 80-70% of calcium fluoride and a solid solution of 80-70% calcium fluoride in 20-30% alumina. It has a M. P. of 1300-1349° C. (2336-2460.2° F.). But for commercial reasons it will not be possible to use pure materials in the manufacture of my fluxes because of the excessive costs of pure materials. Therefore, impurities which are carried in the raw materials that are used will be present in the mixture from which the eutectic is made, and the latter will be influenced to that extent by them. Although the commercial raw materials such as fluorspar and bauxite of good grade do have components other than $CaF_2$ and $Al_2O_3$ it is these two specifically mentioned components and their percentage relationship by weight to each other as brought out in the presentation herein that is significant.

In the drawing the ordinate or horizontal axis represents percent $CaF_2$, starting at 100% on the far left and diminishing to 0% $CaF_2$, while simultaneously representing the percent of $Al_2O_3$ in a complementary way on the ordinate; the percent of $CaF_2$ varies inversely with the percent of $Al_2O_3$. The abscissa represents temperature in degrees centigrade. The heavy black line plotted from the point on the left abscissa indicating 1361° C. to a low point on the abscissa of 1280° C. at a composition of 75% by weight of $CaF_2$ and 25% weight of $Al_2O_3$, then ob- liquely upwardly to the high point on the right abscissa indicating 2020° C. represents the temperatures at which congelation of the two component systems starts. The black dotted line which also intercepts the left abscissa at 1361° C. and the right abscissa at 2020° C., but is positioned below this black solid line at other points corresponding to identical compositions in terms of percent represents the temperature at which the congelation ends. To illustrate, if a composition of 75% $CaF_2$ and 25% $Al_2O_3$, each by weight, in melted condition is cooled it will start to solidify at 1280° C. and will become entirely solid at 1270° C. Likewise if this solidified composition now below 1270° C. is gradually heated, it will commence to melt at 1270° C. and will be entirely liquid at 1280° C. So between the solid, black line and the broken, black line there co-exists both solid and melt. The diagram will further particularize which i. e., of A or B, or A+B. Below the black line and to the left of the ordinate representing 80% $CaF_2$, 20% $Al_2O_3$ is solid solution of $Al_2O_3$ in $CaF_2$. Below the black line and to the right of the ordinate representing 70% $CaF_2$, 30% $Al_2O_3$ is solid solution of $CaF_2$ in $Al_2O_3$.

The eutectic mixture which represents the flux of the present invention falls within the five sided configuration D, E, F, G, H toward the left side of the figure and directly above the ordinate line at the base of the figure. It is designated in the drawing as a solid solution of A+ solid solution of B. The following table sets out the percentages by weight of the two components calcium fluoride and alumina, and the respective congealing temperatures to be found on the drawing:

| Percent by Weight | | Congealing Temperatures | |
|---|---|---|---|
| $CaF_2$ | $Al_2O_3$ | Start, ° C. | End, ° C. |
| 100 | 0 | 1,361 | 1,361 |
| 80 | 20 | 1,300 | 1,270 |
| 75 | 25 | 1,280 | 1,270 |
| 70 | 30 | 1,349 | 1,304 |
| 0 | 100 | 2,020 | 2,020 |

The eutectic mixture can be prepared by intimately mixing 80% to 70% by weight of $CaF_2$ and 20% to 30% by weight of $Al_2O_3$, the percentages being on the basis of the weight of the entire mineral composition, melting them together, then permitting the mass to cool to the solidification point, i. e., temperature. The synthetic mineral is then crushed and screened to size. It will be understood that when 80% by weight of $CaF_2$ is used, 20% by weight of $Al_2O_3$ is used, and that when 70% by weight of $CaF_2$ is used, then 30% by weight of $Al_2O_3$ is used. For percentages by weight of $CaF_2$ between 80% and 70% the difference between that particularly selected percentages and 100% will be the necessary percentage by weight of $Al_2O_3$ to use. The ratio is inverse. Because commercially the source of $CaF_2$ is impure and/or the source of $Al_2O_3$ then that quantity of the source of the respective inorganic components should be weighed out as will yield a binary composition having the proper percentage of $CaF_2$ and $Al_2O_3$ as just explained. As nearly pure sources of $CaF_2$ and $Al_2O_3$ should be used as possible. Sources of $Al_2O_3$ other than bauxite can be used for example aluminum dross, cryolite, corundum, gibbsite and diaspore.

In accordance with the present invention a eutectic mixture of 80–70% of weight of $CaF_2$ and 20–30% by weight of $Al_2O_3$ is added to the partly formed slag of the open hearth or electric furnace processes. A satisfactory method of its use will now be presented.

The charge, consisting of iron to be converted to steel, iron oxide and limestone or other sources of calcium oxide, is heated until the iron has become molten. The iron oxide need not be used except where pig iron because of economy has been used in the charge. At this stage the slag has lime floating therein, on the surface on which lime particles there is a coating of dicalcium silicate. This last has a very high melting point, 2130° C. (3866° F.), but its eventual solution is necessary if the impurities are to be removed from the molten metal. By the addition of the eutectic mixture of the composition indicated supra, and which is characterized by a low melting point (1300–1349° C.=2336–2460.2° F.) the high melting point dicalcium silicate (2130° C.=3866° F.), high M. P. lime (2570° C.=4658° F.) each go into solution, at temperatures which are well within the range of that held by the slag, i. e., 1500–1700° C. (2732–3092° F.).

By adding an eutectic mixture of $CaF_2$ and $Al_2O_3$ to the slag bath as disclosed, it is possible to rapidly flux and combine the dicalcium silicate coating surrounding the lumps of lime as well as flux the lime itself. This puts them into solution, thus completing the formation of the slag. There is thus secured a mature slag which is liquid, creamy and by its nature endowed with activity to combine with and remove from the underlying metal the impurities which are deleterious to the quality of the metal itself. This slag is capable of removing such impurities as oxides, silicates and sulfides from the molten steel which is thereby refined and brought to the desired end point.

The value of this new flux resides in its having the good quality of fluorspar in that it fluidizes the slag, and correspondingly that it has the good qualities of aluminum oxide which has a strong affinity for lime, which will control the oxide phase, since the lime-aluminum oxide-iron oxide mineral, tetracalcium alumino-ferrite $$(4CaOAl_2O_3Fe_2O_3)$$

which is formed in the slag after the formation of dicalcium silicate, is stable in the basic open hearth furnace steel manufacturing process. This new flux furthermore, because of the properties of $Al_2O_3$ and the amount of $Al_2O_3$ present in the flux, acts to inhibit the formation of dicalcium ferrite in the early stages of the formation and maturing of the slag; dicalcium ferrite is the product that $CaF_2$ alone as a flux promotes in steel manufacture. Dicalcium ferrite is not stable and tends to yield FeO in the slag. By the use of this new flux dicalcium ferrite will not form prior to the completion of the formation of all the tetra calcium alumino ferrite that can be formed from the alumina present under the conditions of operation. At the lower temperature now in the batch the $CaF_2$ in the flux then forms dicalcium ferrite, in the slag which reacts in turn with the molten iron to form FeO. The last reacts with the excess carbon which is present as iron carbide in the metal bath to oxidize the carbon. The carbon is reduced to that point where it is proper to give the type of steel desired. In the use of the new flux dicalcium ferrite is formed but not until approximately all of the lime has been solubilized and/or combined. The equations below will aid in understanding the steps and the order of occurrence when viewed in conjunction with the aforesaid explanation.

The following reactions represented by chemical equations are believed to take place in the manufacture of steel by the basic open-hearth furnace process when fluorspar is the flux and when alumina is the flux respectively.

FLUORSPAR REACTIONS (1) $FeOMnOSiO_2$ plus $2CaO \rightarrow 2CaOSiO_2$ plus FeO plus MnO
(2) $2CaOSiO_2$ plus $2CaF_2$ plus $Fe_2O_3 \rightarrow 2CaOFe_2O_3$ plus $SiF_4$ plus 2CaO
(3) $2CaOFe_2O_3$ plus $Fe \rightarrow 2CaO$ plus 3FeO
(4) $Fe_3C$ plus $FeO \rightarrow CO$ plus 4Fe (foam produced)

ALUMINA REACTIONS (1) $FeOMnOSiO_2$ plus $2CaO \rightarrow 2CaOSiO_2$ plus FeO plus MnO
(2) $2CaOSiO_2$ plus $Al_2O_3 \rightarrow 2CaOAl_2O_3SiO_2$
(3) $2CaOAl_2O_3SiO_2$ plus $CaO \rightarrow 2CaOSiO_2$ plus $CaOAl_2O_3$
(4) $CaOAl_2O_3$ plus $Fe_2O_3$ plus $3CaO \rightarrow 4CaOAl_2O_3Fe_2O_3$
(5) $4CaOAl_2O_3Fe_2O_3$ plus $CaO \rightarrow$ lowers temperature to 1395° C. from 1415° C. (no foam produced).

For a better understanding of the manufacture of iron and steel by the open hearth and electric furnace processes, particularly by the present invention wherein lime or limestone is used as with the charge but the flux contains calcium fluoride and aluminum oxide, the melting point of the various reacting substances and end products to be found in the equations supra are herewith given.

MELTING POINTS OF THE REACTANTS, ETC., IN DEGREES CENTIGRADE

|  | ° C. |
|---|---|
| CaO | 2570 |
| $Al_2O_3$ | 2050 |
| $2CaOSiO_2$ | 2131 |
| $FeOMnOSiO_2$ | 1300 |
| $2CaOAl_2O_3SiO_2$ | 1550 |
| $CaOAl_2O_3$ | 1500 |
| $4CaOAl_2O_3Fe_2O_3$ | 1415 |
| $2CaOFe_2O_3$ | 1436 |
| $Fe_2O_3$ | 1565 |
| Fe | 1600 |
| FeO | 1380 |
| $CaF_2$ | 1386 |

That my invention may be more fully understood, the more detailed practice thereof is illustrated by the following example:

*Example*

The temperature of the open hearth furnace, 1500–1700° C. is above the melting point of the charge. This is well above the melting point of any of the eutectic mixtures in the space bounded by the area D, E, F, G, H in the drawing. But from a glance at the table it is much below the melting point of dicalcium silicate and lime respectively.

I elect to use a typical charge in an open hearth furnace, wherein a charge consists of limestone, iron ore or sinter, steel scrap and molten pig iron, wherein the percentage of pig iron normally is sufficient to cause a flush slag run-off. This flush slag normally takes out a large percentage of the silica which is formed in the slag primarily from the silicon in the pig iron. As much as 50% or more of the silica is commonly removed in this manner which decreases the need for the equivalent amount of lime because of this excluded silica in the run-off slag.

As soon as the run-off slag is completed, the process using the $CaF_2Al_2O_3$ flux of the present invention is carried on, and the lime boil begins. This lime boil results from the melting of the steel scrap and the releasing of the low specific gravity limestone or lime that is underneath the scrap. In this manner, the lime rises to the surface, and as it does, there is added this new eutectic flux, 20–30% aluminum oxide, 80–70% calcium fluoride, doing so with care. Because of the relatively very low melting point, I prefer that eutectic mixture which has a composition of 75% $CaF_2$ and 25% $Al_2O_3$ by weight.

However, since the dominating percentage in the new flux is calcium fluoride (fluorspar the natural product), it should not be used in excess of the amount that is necessary to keep the formation of dicalcium ferrite to a minimum, my preference being to lean toward the formation of tetra-calcium alumino ferrite which will control the oxide phase of the slag.

The new flux may be added, as pointed out supra, judiciously until enough has been used to fluidize all of the lime, after which a normal steel making practice presently used commercially can be followed.

One of the dangers encountered in the unskillful use of fluorspar to thin the slag in steel manufacture by the open hearth process is that of excess oxidation of the slag. Because aluminum oxide, $Al_2O_3$, is present in my flux the bad feature of over-oxidation is inhibited. On the other hand, alumina produces tetra-calcium alumino ferrite, $4CaOAl_2O_3Fe_2O_3$, which complex ferrite is stable, and controls the oxide phase without losing its power to fluidize the lime and finally the slag. See equations supra on fluorspar and alumina reactions.

The amount of the $CaF_2Al_2O_3$ eutectic mixture that will be necessary to add to the slag to facilitate the solution of the lime will vary, depending on whether the steel to be produced is a low carbon steel or a high carbon steel or an alloy steel. It will also depend upon the percentage of lime in the slag, the state of oxidation of the iron, the temperature of the bath, and the carbon content of steel scrap being melted, as well as other variables. As an approximation the amount of fluorspar which has been commercially employed in the industry may serve as a gauge. In "Open Hearth Proceedings," of A. I. M. E., year 1943, Carnegie Illinois Steel Corporation reported the following consumption of fluorspar per ton of ingots produced in the following grades:

| | Pounds per ton of ingots |
|---|---|
| Low carbon steel | 1 to 2 |
| High carbon steel | 4 to 5 |
| Alloy steel | 6 to 7 |

The amount of fluorspar used may in some cases, especially when a high percentage of lime is used in the charge, range as high as 15 pounds per ton of ingots melted. It would not be over about 1.0% per ton of total iron melt.

The eutectic mixtures of the type which have been discussed herein, when introduced into the open hearth or electric furnace slag systems, will first melt because of the low melting points of the added mineral and then unite with one or more of the components that are present in the slag more particularly silicates of lime. And, as in accordance with the law of eutectic mixtures, they will form a product of even lower melting point. These two accomplishments will speed up the reaction of putting the undissolved lime and other calcium components into the fluid state in the slag.

Obviously modifications and variations of the invention as above set forth may be made without departing from the spirit and scope thereof, and therefore only such limitations should be imposed as are indicated in the appended claims.

I claim as my invention:

1. The method of conditioning open hearth and electric furnace slags in steel manufacture, which slags contain dicalcium silicate and free lime, comprising the steps of adding a eutectic mixture to the slag, the ingredients of which eutectic mixture are 80–70% calcium fluoride and 20–30% aluminum oxide each by weight of the mass, the sum total by weight of which paired ingredients is 100%, which slag has been formed by heating a charge of metallic iron to be converted and calcium oxide, the amount of the eutectic mixture being not over about 1.0% per ton of total iron melted, the temperature of the furnace being above the melting point of the charge and still further above the melting point of the eutectic mixture but below the melting point of dicalcium silicate and of lime respectively, the addition of the eutectic mixture fluidizing the slag by melting of the eutectic mixture which then combines with components of the slag.

2. The method of conditioning open hearth and electric furnace slags in steel manufacture, which slags contain dicalcium silicate and free lime, comprising the steps of adding a eutectic mixture to the slag, the ingredients of which eutectic mixture are 80–70% calcium fluoride and 20–30% aluminum oxide each by weight of the mass, the sum total by weight of which paired ingredients is 100%, which slag has been formed by heating a charge of steel scrap and pig iron to be converted and calcium oxide, the amount of the eutectic mixture being not over about 1.0% per ton of total iron melted, the temperature of the furnace being above the melting point of the charge and still further above the melting point of the eutectic mixture but below the melting point of dicalcium silicate and of lime respectively, the addition of the eutectic mixture fluidizing the slag by melting of the eutectic mixture which then combines with components of the slag.

3. The method of conditioning open hearth and electric furnace slags in steel manufacture, which slags contain dicalcium silicate and free lime, comprising the steps of adding a eutectic mixture to the slag, the ingredients of which eutectic mixture are 80–70% calcium fluoride and 20–30% aluminum oxide each by weight of the mass, the sum total by weight of which paired ingredients is 100%, which slag has been formed by heating a charge of steel scrap, pig iron and iron oxide to be converted and calcium oxide, the amount of the eutectic mixture being not over about 1.0% per ton of total iron melted, the temperature of the furnace being above the melting point of the charge and still further above the melting point of the eutectic mixture but below the melting point of the dicalcium silicate and of lime respectively, the addition of the eutectic mixture fluidizing the slag by melting of the eutectic mixture which then combines with components of the slag.

References Cited in the file of this patent

UNITED STATES PATENTS

| Re. 23,778 | Bowden | Feb. 9, 1954 |
| 2,027,868 | Kinzel | Jan. 14, 1936 |
| 2,750,280 | Perrin | June 12, 1956 |